Sept. 18, 1951     R. J. S. PIGOTT     2,568,026
RELIEF AND CONTROL VALVE
Filed March 28, 1945

Inventor
REGINALD J. S. PIGOTT
By A. M. Houghton
His Attorney

Patented Sept. 18, 1951

2,568,026

UNITED STATES PATENT OFFICE 2,568,026

RELIEF AND CONTROL VALVE

Reginald J. S. Pigott, Pittsburgh, Pa., assignor to Gulf Research & Development Company, Pittsburgh, Pa., a corporation of Delaware Application March 28, 1945, Serial No. 585,273

3 Claims. (Cl. 137—53)

This invention relates to improvements in relief and control valves of the spring or weight loaded types and more particularly to a construction which eliminates chattering at all positions of opening and closing, and under various pressure and flow conditions.

Loaded valves of conventional construction have an inherent instability which causes them to chatter when they are only slightly raised from the seat. Both relief valves for steam and gaseous fluids and liquid control valves of the aforementioned types exhibit this tendency, particularly where pressure is high and flow is restricted. In homogenizer operations, for example, it may be desired to operate a loaded control valve under a seating pressure of 1000 to 2000 pounds and yet maintain an opening of only 0.001 inch under pressure of the flow. In fact, the present valve has operated successfully under those conditions and has been found to be perfectly steady and free from chatter.

The phenomenon of chattering is caused by static pressure which is built up between the fixed and movable seating surfaces as they begin to separate. The valve is lifted farther from its seat than the flow requires, causing the static pressure under the valve to be lowered a little by increasing friction loss in the inlet and outlet lines, and as a consequence the valve immediately starts to re-seat. These effects are experienced in rapid succession and give rise to chattering which is destructive to the seat as well as to the piping and the equipment in the connected system.

The improvements which comprise this invention are embodied in a valve of conventional type but with seating surfaces so conformed and arranged that when they are separated even very slightly, there is substantially no static pressure exerted on them tending to force them farther apart, and the issuing stream is so directed that reaction effects, also tending to open the valve, are avoided. No force is exerted on the movable valve member which tends to lift it off its seat farther than is required by the flow. Consequently the valve is stable in all positions. Furthermore, since none of the high speed portion of the issuing stream flows in contact with the seating and approach surfaces substantially all erosion of the seat due to flow, commonly called wire drawing, is eliminated.

The advantages of the present invention are emphasized by comparison with the usual safety or "pop" valves for relieving excess pressure of steam or other gaseous fluids against loading springs or weights. Chattering in such valves is avoided by suddenly opening the valve with the assisting force of the escaping and expanding fluid. The seating surfaces and associated surfaces are relatively wide and the flow is so directed that the emerging jet of steam exerts static pressure on them over their entire area. In addition, such valves frequently have an adjustable shrouding flange carried by the valve disc and extending around the seat to enclose a huddling chamber in which the pressure of the steam acts additionally to raise the valve. Furthermore, as the jet of steam strikes the inclined shrouding flange and is deflected by it, the resultant impact force also tends to raise the valve disc. The cumulative effect of these forces is to cause the valve suddenly to pop open for pressure relief, and it accordingly derives its name from this action.

In valves made according to the present invention no shrouding flange is employed and jetting of the fluid against the overhang of the valve is avoided by directing the stream horizontally and at right angles to the axis of valve movement. Since the jet does not impinge upon the movable valve, no resultant force is encountered which tends to open it.

The seating surfaces themselves are sharp-edged and as narrow as practicable to support the loading pressure without crushing. In a one and one-half inch pipe size valve, the seat would be approximately 0.05 inch wide. The face of the valve is recessed so that its seating surface constitutes the edge of a wall which is of appreciable depth. Thus, a vena contracta is fully developed in the orifice defined by the separated valve and seat, and the stream as so constricted does not contact the separated seating surfaces to exert static pressure tending to force them apart. Stability is further increased by dash pot action of the piston on the valve, operating in a closed cylinder and responding to valve movements, thereby to damp them, as will appear from the description which is to follow.

It is acordingly an object of my invention to provide loaded relief and control valves with cooperating valve and seat members which are so constructed that a vena contracta is formed in the stream of fluid issuing from the orifice between the separated members, thereby to relieve them of static pressure tending to lift the valve from its seat.

It is another object of my invention to provide a loaded valve with damping means for retarding its opening and closing movements, thereby to suppress incipient popping effect and chattering.

Other and further objects will be apparent from the following description and drawings in which Figure 1 is a longitudinal sectional view of a spring loaded valve embodying this invention;

Figure 1:
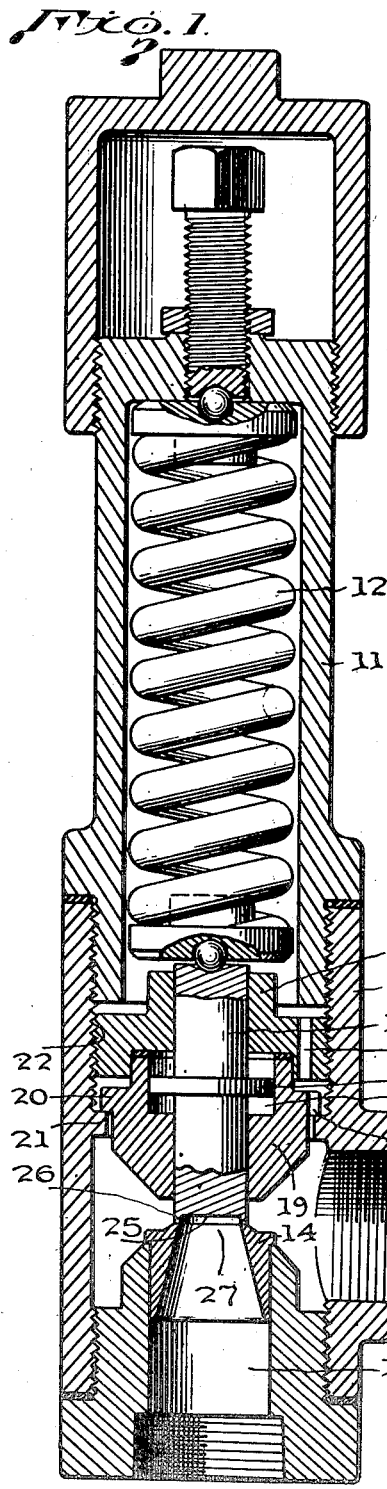

The valve as a whole comprises a body 10 and bonnet 11 enclosing a loading spring 12 which acts upon a reciprocable valve 13 to seat the same upon the narrow projecting surface of a ferrule 14 mounted in the inlet passage 15. The valve 13 has an enlargement 16 intermediate its ends which functions as a piston, reciprocating in a recess 17 in the lower end of a pair of interengaging guide members 18 and 19. A peripheral flange 20 on the recessed guide member 19 supports the same on a shoulder 21 within the valve body, and the upper guide member 18 constitutes a cap which is screwed down upon it by engagement with the internal threads 22. The guide members are formed with passages 23 and 24 so that fluid may find its way into the bonnet. As the valve and its piston have a controlled loose fit in the guides, leakage is permitted both around the piston and along the stem in both directions of movement of the valve, whereby damping is achieved by dash pot action.

Where the conditions of operation are such that the bonnet is completely filled with gas-free liquid the upper guide member 18 may be omitted, in which case the bonnet itself serves as the rear end of a cylinder for controlling upward kick. In this construction, with no tight fit around the piston rod or stem, the piston itself will be fitted somewhat closer than where both upper and lower guides are employed.

The face of the valve is recessed centrally as at 25 leaving a narrow projecting wall 26, the flat edge of which constitutes its seating surface. This recess must be of such dimensions that the wall 25 has a depth which is not less than one-eighth of the diameter of the throat opening 27 in ferrule 14 and it must terminate in a substantially sharp inner edge.

In the embodiment shown in Figure 1 the recess in the valve face provides a wall at right angles to the seating surface, whereas the wall of throat 27 tapers slightly outward to a sharp-edged seat of the same surface area as that of the valve. The included angle between the wall of the throat 27 and the seat is not greater than approximately ninety degrees although as shown in Figure 1 it may be less than that.

Figure 2:
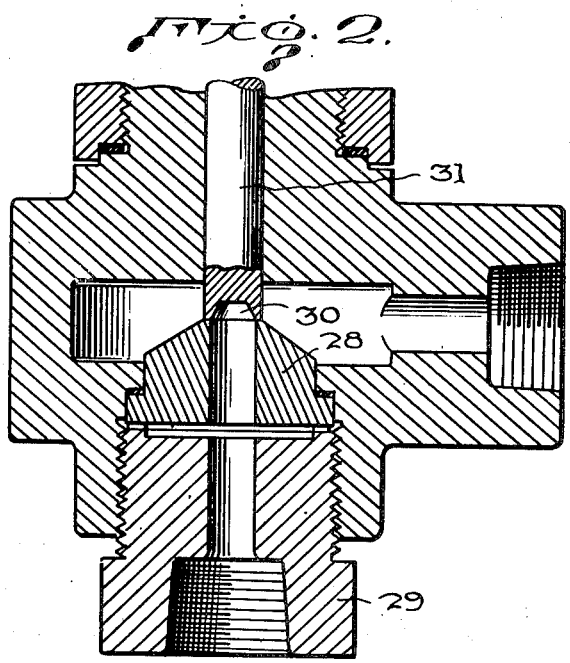
Figure 2 is a sectional view showing the lower end of a valve having fixed and movable seating members of modified form.

In Figure 2, instead of employing a ferrule as at 14 in Figure 1, the seat member 28 is in the form of a nozzle which projects through an opening in the valve body and is clamped in position by a plug 29 engaging behind its base flange. The plug has a bore coaxial with that of the nozzle, and at the approach side the wall of the throat is at right angles to the narrow seating surface. In this form of the invention the recess 30 in the face of valve 31 provides a peripheral wall of tapering thickness terminating in a corresponding narrow and sharp-edged seating surface on the valve.

Figure 3:
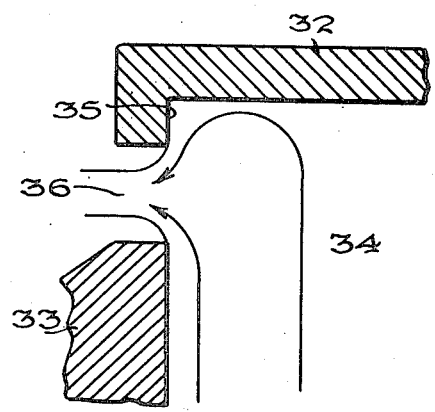
Figure 3 is a fragmentary sectional view, which is partly diagrammatic, showing the paths of flow in the approach to the orifice and the vena contracta formed in between the separated seating surfaces.

The aforesaid constructions direct the flow of issuing liquid in the manner shown diagrammatically in Figure 3. Streamlining the flow, as will be observed, is avoided by making the wall surface on the approach side of the orifice of definite and appreciable depth. Thus, as the valve 32 is moved from its seat 33, fluid in the space 34 must flow over and around the wall 35, following the course of the uppermost arrow in Figure 3. The peripheral portions of the stream flowing up along the inner wall of seat 33 and across its sharp inner edge will follow the path of the lowermost arrow in Figure 3 and will produce a vena contracta 36 in the issuing stream, which is fully developed on both sides of the orifice defined by the separated seating surfaces. Since the stream is thereby constricted and out of contact with the exposed areas of the seating surfaces it will not exert static pressure on them which would otherwise tend to force them apart.

As will also be noted from inspection of Figure 3, the issuing stream is directed at right angles to the direction of valve movement and it does not therefore impinge upon the overhang of the valve with consequent tendency to lift the same by jet action.

As a consequence of these features liquid entering the valve inlet and under sufficient pressure to lift the valve from its seat against loading pressure will thereupon flow between the fixed and movable surfaces without exerting forces which tend to open the valve to a greater extent than is required to establish and maintain the flow. The valve is therefore steady and without flutter or chatter.

What I claim is:

1. A valve comprising a body having inlet and outlet ports and a communicating passageway therebetween, a fixed seat in said passageway comprising a narrow, flat-surfaced annulus having a sharp inner edge, the included angle between said seat and passageway being not greater than approximately ninety degrees, a valve member urged into sealing contact with said seat by yieldable loading means, said valve member comprising a guided portion of uniform diameter having at its end a flat, annular seating surface of substantially the same size as said fixed seat and defined by a recess in a face thereof, the side wall of said recess being substantially perpendicular to the seating surface, thereby defining a sharp inner edge at the juncture therewith, and of a depth at least one-eighth of the inner diameter of said fixed seat, whereby a vena contracta is fully developed in the stream flowing between the separated valve member and seat when flow is established and they are thereby relieved of static pressure tending to cause chatter.

2. In a valve, a fixed seat having a flat, annular surface and an inner, annular wall, the included angle between said annular wall and flat surface being not greater than approximately ninety degrees, a yieldably loaded valve member urged into sealing contact with said fixed seat and having a flat, annular seating surface coextensive with that of said seat and defined by a central recess in said member, the seating surfaces of said seat and valve member constituting narrow, annular projections the inner edges of which are sharply angular, the side wall of said central recess being substantially perpendicular to the seating surface of said valve member and of a depth at least one-eighth of the diameter of the opening in said fixed seat, whereby a vena contracta is fully developed in a stream flowing between the separated valve member and seat when flow is established, which constriction of the high speed stream to less than the spacing between the seating surfaces and out of contact with them reduces the erosion of such surfaces and relieves them of static pressure tending to cause chatter.

3. A valve including a body having inlet and outlet ports and a communicating passageway therebetween, a flat-surfaced annulus comprising a fixed seat in said passageway and defining with the passageway a sharp inner edge, the included angle between said seat and passageway being not greater than approximately ninety degrees, a movable valve member comprising a cylindrical stem terminating in a projecting sharp-edged annulus having a seating surface substantially co-equal with that of the fixed seat, the outer wall of which annulus forms an unbroken continuation of the cylindrical surface of said stem and the inner wall of which is defined by a generally cylindrical recess in the end of such stem, of a depth at least one-eighth of the inner diameter of said fixed seat, whereby a vena contracta is fully developed in a stream issuing between the separated seating surfaces of the stem and fixed seat, yieldable loading means urging said stem into contact with said fixed seat, a piston carried by said stem and received within a chamber in said valve body in which fluid is trapped, said piston being loosely fitted in said chamber to permit restricted flow of the trapped fluid therearound during reciprocation of the stem, thereby to produce a dashpot action in the opening and closing of the valve.

REGINALD J. S. PIGOTT.

REFERENCES CITED

The following references are of record in the file of this patent:

UNITED STATES PATENTS

| Number | Name | Date |
|---|---|---|
| 116,084 | Neynaber | June 20, 1871 |
| 274,133 | Meady | Mar. 20, 1883 |
| 306,387 | Crosby | Oct. 14, 1884 |
| 1,020,921 | Miller | Mar. 19, 1912 |
| 1,260,487 | Vincent | Mar. 26, 1918 |
| 2,091,669 | Bryant | Aug. 31, 1937 |
| 2,145,870 | Gentzel | Feb. 7, 1939 |
| 2,219,324 | Lee | Oct. 29, 1940 |
| 2,277,656 | Falls | Mar. 24, 1942 |
| 2,289,239 | Bryant | July 7, 1942 |
| 2,345,389 | Falls | Mar. 28, 1944 |

FOREIGN PATENTS

| Number | Country | Date |
|---|---|---|
| 351,798 | France | May 15, 1905 |
| 379,757 | France | Sept. 17, 1907 |
| 656,643 | Germany | Feb. 12, 1938 |